United States Patent [19]
Roehling et al.

[11] Patent Number: 5,422,768
[45] Date of Patent: Jun. 6, 1995

[54] COMPLIANT HARD DISK ASSEMBLY FOR A RECORDING/REPRODUCING DEVICE

[75] Inventors: Donald P. Roehling; Gary M. Peter, both of Boise, Id.

[73] Assignee: Hewlett-Packard Company, Palo Alto, Calif.

[21] Appl. No.: 250,900

[22] Filed: May 31, 1994

[51] Int. Cl.⁶ .................................................. G11B 17/08
[52] U.S. Cl. ................................. 360/98.08; 360/99.12
[58] Field of Search ........................... 360/98.08, 99.12

[56] References Cited

U.S. PATENT DOCUMENTS

| | | | |
|---|---|---|---|
| 4,945,432 | 7/1990 | Matsudaira et al. | 360/98.08 |
| 4,999,724 | 3/1991 | McAllister et al. | 360/98.08 |
| 5,006,942 | 4/1991 | Brooks et al. | 360/98.08 |
| 5,243,481 | 9/1993 | Dunckley et al. | 360/98.08 X |
| 5,317,225 | 5/1994 | Miyaji et al. | 360/98.08 X |

*Primary Examiner*—John H. Wolff
*Attorney, Agent, or Firm*—E. F. Oberheim

[57] ABSTRACT

To minimize unwanted motion in a hard disk assembly in a hard disk drive, an elastomeric support is employed to mount a hard disk pack for rotation by a motor rotor of a disk spindle motor. The hard disk pack includes a hard disk support ring which has opposite annular axial faces upon which the hard disks are securely mounted and axially spaced thereby. An elastomeric connection between the hard disk support ring and a cylindrical body of the motor rotor of the disk spindle motor, provides a soft, or compliant, support for the hard disk pack.

8 Claims, 7 Drawing Sheets

COMPLIANT HARD DISK ASSEMBLY FOR A RECORDING/REPRODUCING DEVICE

RELATED APPLICATION

A co-pending application of James C. Anderson et al, Ser. No.: 07/975,757, filed Nov. 13, 1992, entitled "Low Profile Disk Assembly And Attachment Means For A Hard Disk Drive", assigned to the assignee of this invention, contains subject matter disclosed in this application. (1092729-1)

TECHNICAL FIELD

This invention relates generally to recording/reproducing devices, such as hard disk drives and particularly to a hard disk assembly therefor for minimizing unwanted disk motion induced by the motor drive system, or power train, of the hard disk assembly.

BACKGROUND OF THE INVENTION

In prior art disk drives, the disk(s) are conventionally hard mounted to a hub, as seen in FIGS. 1 and 2, of U.S. Pat. No. 3,587,074 to A. M. Angle et al; or to a motor rotor as seen in FIG. 1, the prior art, of U.S. Pat. No. 4,945,432 to T. Matsudaira et al, and FIG. 1 of U.S. Pat. No. 4,965,476 to J. G. Lin. In all such hard mounted hard disk assemblies, the motion of the power train which drives the hard disk or disks, induces unwanted disk motion which adversely affects the read/write function of the head/disk assembly.

The thrust of the teachings of Matsudaira et al, as to their invention, is to provide an axially compliant mount for fragile disks in a disk stack so that the "—magnetic disks 1 are protected against extraordinarily large forces caused by the difference in thermal expansion of different components. Thus, the disks are not deformed and do not break." (column 4, lines 31-33 of Matsudaira et al).

Matsudaira et al, in FIG. 2, for example, illustrate a disk assembly, such as an assembly of ceramic or glass disks, in a disk stack on the hub of a motor rotor. The disks in the disk stack are spaced apart by elastic spacers and clamped in a stack between a shoulder 10 at the bottom of the motor hub or spindle and a clamp secured at the upper end of the motor hub.

In small form factor disk drives, the mounting of the disk is critical. Disk flatness requirements in small form factor disk drives frequently are much tighter than acceptable tolerances in larger drives. Soft mounts for individual disks, as taught by Matsudaira et al, are unacceptable. As seen in FIG. 1, the prior art, in the present application, which illustrates a small form factor memory disk assembly 8, say, of the order of 1.3 form factor, a hard disk pack 3 comprising a disk support ring 3a, functioning both as a disk mount and a disk spacer ring, is provided with coaxial, flat, annular, axial surfaces, 3b, 3c, to which the hard disks, 3d, 3e, are adhesively bonded. This is a hard mount of the hard disks, 3d, 3e. The adhesive bonding is the sole support of the hard disks, 3d, 3e, in the hard disk pack 3. Inner annular coaxial surfaces, 3f, 3g, of the hard disk support ring 3a of the hard disk pack 3, provide hard mounting surfaces for the hard disk support ring 3a of the hard disk pack 3, on a cylindrical section 5a of the motor rotor 5 which powers the disk pack 3. The disk pack 3, as used here, may comprise only one disk 3d, but the requirement of a hard flat mount for warp-free mounting of that single disk 3d remains.

The disk support ring 3a of the hard disk pack 3 provides a sturdy mount for attachment to the cylindrical section 5a of the motor rotor 5. Thus, when the inner annular axial surfaces, 3f, 3g, of the disk support ring 3a are subject to clamping pressure between a shoulder 5b on the cylindrical section 5a on the motor rotor, and a clamp 5c at the end of the cylindrical section 5a, there is no distortion of the disk support ring 3a of the disk pack 3 at least, in the region where the disks are bonded, to distort or warp the disks, 3d, 3e, bonded thereto. But this is a hard mount of the disk spacer ring 3a, and, while it is an ideal mount for the small thin fragile disks, it also transmits motion, other than rotation, from the power train of the hard disk assembly to the disk pack 3 and to the disks, 3d, 3e.

This is acceptable for certain track and bit densities on the hard disks, but the pressure to increase data storage without increasing storage volume, indicates the need to minimize unwanted disk motion. The teachings of the prior art referenced above, indicate no awareness of the undesirable effects of unwanted disk motion, indicate no awareness of the problem associated with and causing that undesirable condition and suggest no solution to that problem, either directly, by implication, or by accident.

SUMMARY OF THE INVENTION

According to the presently known best mode for practicing this invention, a hard disk assembly designed for minimizing unwanted disk motion, comprises a hard disk pack which is compliantly mounted to the power train of the hard disk assembly. The power train, as used here, includes the motor of the hard disk assembly and any part of the motor such as the motor rotor or a motor shaft, which is connected to the hard disk pack. The compliant hard disk pack mount is also referred to herein as a "soft" mount, the soft mount comprising a material having elasticity and a "memory" of position, form or shape to which it returns after a displacement, with minimum or no hysteresis.

In implementing this invention, the power train comprises a rotatable hub or rotor which has a cylindrical body having a cylinder axis about which the hub or rotor rotates. The hard disk pack comprises a hard disk support ring which has a hard, flat, annular, axial face concentrically disposed about a central circular opening and at least one hard disk which has a central circular opening of greater diameter than the circular opening in the hard disk support ring. The hard disk is concentrically secured, as by adhesive bonding, to the axial surface of the hard disk support ring to form the hard disk pack. The cylindrical body of the rotatable hub is fitted through the central circular opening of the hard disk support ring of the hard disk pack, in which position the hard disk support ring of the hard disk pack is mounted, as by elastomeric attachment, to the cylindrical body of the rotatable hub to provide a compliant, hard disk pack mount.

This soft mounting of the hard disk pack of the hard disk assembly attenuates the unwanted power train energy and thereby isolates the hard disk pack from unwanted power train motion. Comparative tests between the hard mount, hard disk pack arrangement of FIG. 1, for example, with the soft, or compliant, mount of the hard disk pack according to this invention were conducted, using the same disk drive in each comparative test. Comparative hard mount and soft, or compliant mount, tests using five different disk drives were conducted. The results of these five different comparative tests demonstrated an 80% to 90% reduction in the resonant peak of the position error signal, using the compliant hard disk pack mount. Similar results have been obtained for specific peaking orders (as measured by a power spectrum under normal operating conditions).

Advantageously, the attenuation of unwanted power train mechanical energy and resulting isolation of the unwanted power train energy from the hard disk pack, reduces unwanted disk motion sufficiently to permit higher density disk track recording with the same power train in the same storage volume.

BRIEF DESCRIPTION OF THE DRAWINGS

A better understanding of this invention will be had by reference to the following specification when considered in conjunction with the accompanying drawings, in which.

DESCRIPTION OF THE PREFERRED EMBODIMENTS

Figure 1:
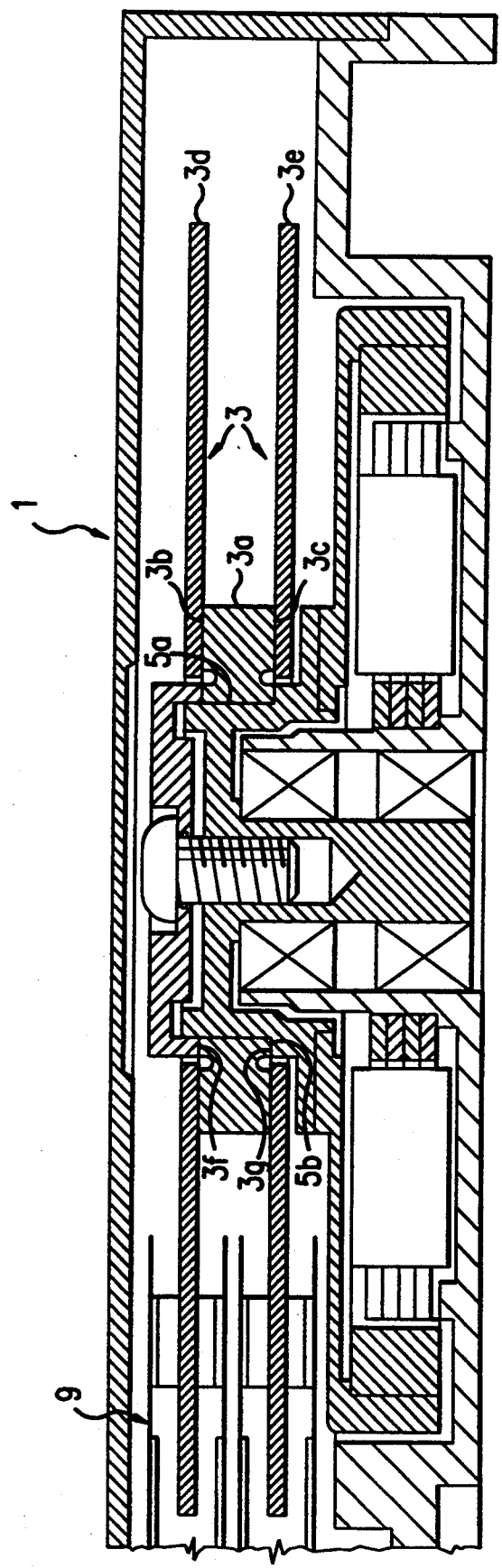
FIG. 1, is a cross sectional view of a hard disk assembly of the prior art, taken in a section plane including the axis of rotation of the memory disk assembly.

Among the FIGS. 2-5 herein, corresponding parts bear like reference characters.

Figure 2:
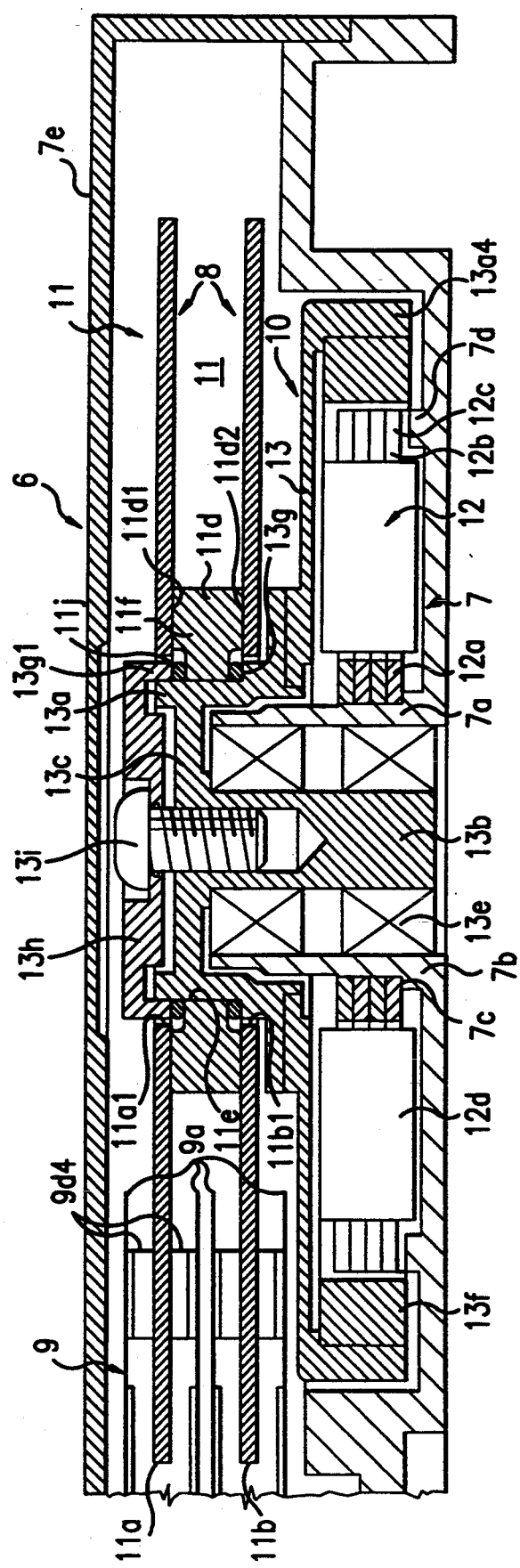
FIG. 2, is a cross sectional view of the type of FIG. 1, illustrating a tested embodiment of this invention.
Figure 3:
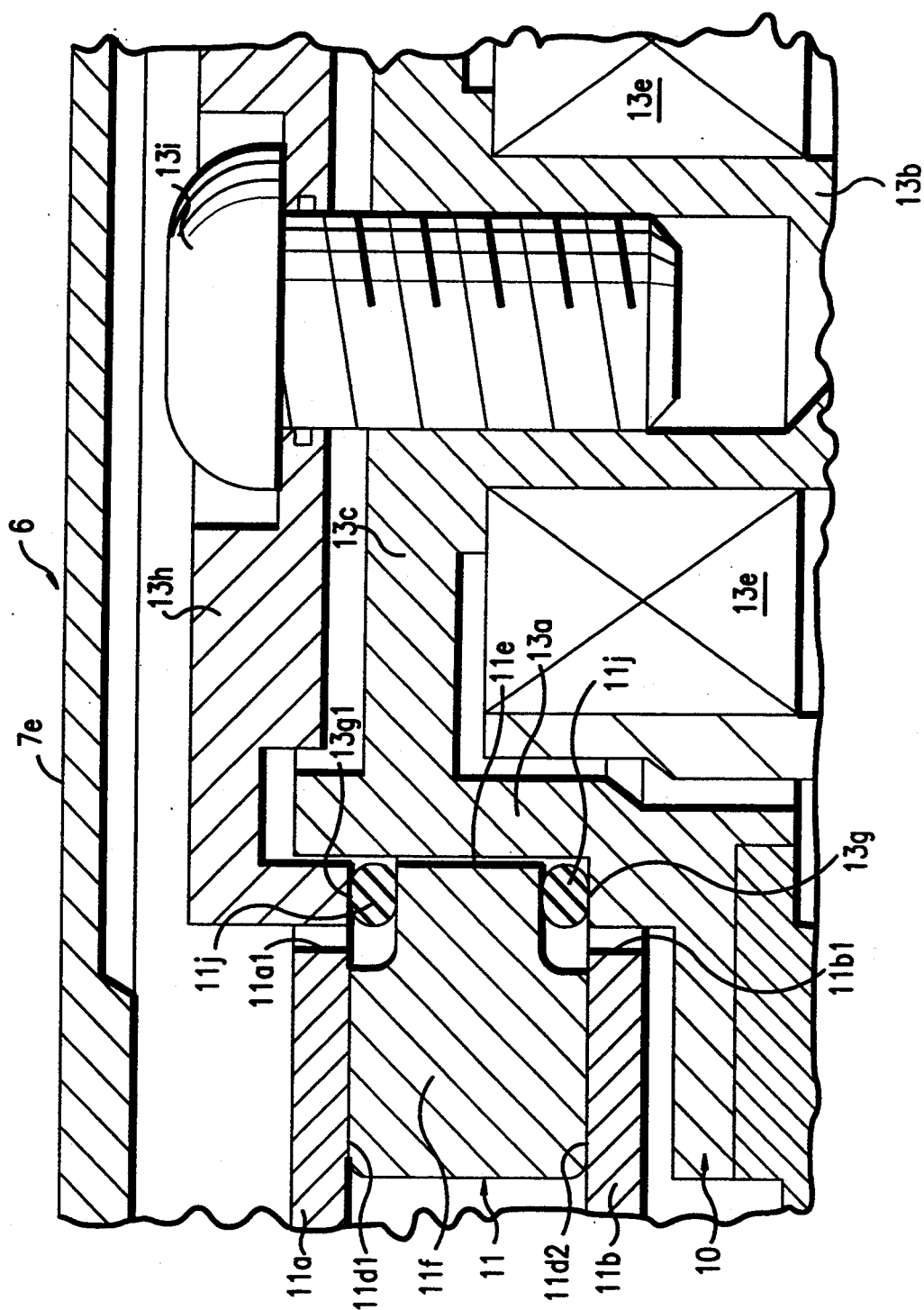
FIG. 3, is an enlargement of a fragmentary portion of FIG. 2 illustrating a presently preferred embodiment of this invention in larger detail.

FIG. 2 is a sectional view of a small form factor (1.3 form factor, for example) hard disk drive, seen as a sectional view of the hard disk assembly taken in a section plane which includes the spin axis of the memory disk assembly. FIG. 2 is drawn to an enlarged scale and FIG. 3 is a further enlargement of a fragmentary portion of FIG. 2, to provide enlargement of the illustration of essential detail.

The hard disk drive 6 is not shown in its entirety in the interest of simplicity, the invention residing in the hard disk assembly.

In FIG. 2, the mainframe or support structure 7 of metal, such as aluminum, is the primary structural member of the disk drive 6. A cover 7e is bonded to the mainframe 7 to seal and encloses the disk drive therewithin.

The hard disk drive further comprises a hard disk assembly 8 and a rotary actuator assembly 9. The rotary actuator assembly 9 is only fragmentarily shown at the left of FIG. 2. Both the rotary actuator assembly 9 and the hard disk assembly 8 are mounted upon the mainframe 7.

The rotary actuator 9 is conventionally journaled (not shown) on the mainframe 7 and comprises four load beams 9a in an armstack, one load beam above and one load beam below each hard disk, 11a, 11b, of a hard disk pack 11 of the hard disk assembly 8. Each load beam 9a mounts a magnetic head 9d4 adjacent its distal end. An actuator motor (not shown) conventionally powers the rotary actuator.

The hard disk assembly 8, which is the subject of this invention, is described below.

The hard disk assembly 8 includes a power train which comprises a salient pole, direct current disk motor 10, which has a salient pole stator 12 and an umbrella shaped, disk motor rotor 13. The hard disk pack 11, of the hard disk assembly 8, comprising the pair of disks 11a, 11b and a hard disk support ring 11d, is secured to the disk motor rotor 13. The disk motor rotor 13 comprises a cylindrical body 13a having an end face 13c and a central, axial motor shaft 13b projecting therefrom. The mainframe or support 7 supports a tubular motor mount 7a which projects from the support 7. Preferably, the tubular motor mount 7a is an integral part of the support 7. A bearing assembly, comprising a coaxial bearing pair 13e, journals the motor shaft 13b within the tubular motor mount 7a.

The tubular motor mount 7a is provided with an enlarged diameter cylindrical section 7b at its bottom end defining an external shoulder 7c. The salient pole stator 12 is a laminated assembly of thin plates of magnetic material, comprising a circular center section 12a and individual, radially disposed, salient poles 12b radiating therefrom. The circular center section 12a of the salient pole stator 12 seats upon and is adhesively bonded to, the shoulder 7c. Individual coils or windings 12d are respectively mounted on each salient pole 12b. The salient poles 12b are cantilevered from the circular center section 12a of the salient pole stator 12.

The disk motor rotor 13 is of a magnetic flux conducting material configured of cylindrical sections of several different diameters, increasing in diameter from the top of the motor rotor to its bottom. The cylindrical body 13a of the motor rotor 13 terminates in a shoulder 13g, FIG. 3. A depending peripheral rim 13a4 of the motor rotor 13 mounts an annular, permanent ring 13f which is secured, as by adhesive bonding, to the inner circumferential surface of the depending rim 13a4, in a position encircling the pole tips 12c of the salient poles 12b, defining radial gaps therebetween. The annular permanent magnet 13f is radially magnetized in equally circumferentially spaced positions to form discrete permanent magnet poles different in number from the number of salient poles 12b. Energization of the windings 12d for constant speed motor operation is conventional.

The hard disk pack 11 comprises a stack of two hard disks, 11a, 11b, of non-metallic material such as ceramic material or glass. Metal such as aluminum may also be employed. Each hard disk, 11a, 11b, has a central circular opening, 11a1, 11b1. Each hard disk is adhesively bonded to the opposite annular axial surfaces, 11d1, 11d2 of the disk support ring 11d. The hard disk support ring, 11d, has a central circular opening 11e which is a slip fit over the cylindrical body 13a of the motor rotor 13. This central circular opening 11 e is of smaller diameter than the central circular openings 11a1, 11b1, in the hard disks, 11a, 11b, defining an inner annular flange 11f. This inner annular flange 11f is captured on the cylindrical body 13a of the motor rotor 13 between a shoulder 13g on the cylindrical body 13a and a clamp 13h, secured by a screw 13i at the top of the cylindrical body 13a. This screw 13i threads into the upper end of the motor shaft 13b. Elastomeric toroids 11, such as O-rings, on opposite sides of the inner annular flange 11f, are compressed in the stack between the shoulder 13g and the peripheral rim 13g1 of the clamp 13h, to secure the inner annular flange 11f of the disk support ring 11d in the compliant grip of the elastomeric toroids 13j, whereby radial or angular slippage of the disk pack with respect to the cylindrical body 13a is prevented. Note that this compliant mounting of the hard disk pack 11 to the cylindrical body 13a is achieved without any clamping pressure being applied to the hard disks 11a or 11b. The hard disk pack 11 is a separate integrated entity. Compliant clamping forces of the elastomeric toroids 11j act solely upon the internal annular flange 11f of the disk support ring 11d.

The hard disk pack 11 is an integrated disk stack which is easily assembled and is easily installed and removed with respect to the cylindrical body 13a, as a unitary assembly, by removing the clamp 13h after the magnetic heads 9d4 are moved clear of the disks 11a, 11b.

As seen in FIG. 3, the elastomeric toroids 11j are under compression. The slightly flattened cross sectional shapes of the toroids which are illustrated only approximate the actual cross sectional configurations in compression. Tests of this soft, or compliant mount were conducted in comparison with the hard mount of FIG. 1 at 10% compression and 20% compression of the diameter of the toroids 11j. In all cases, the clamping forces were sufficient to obviate relative displacement radially or angularly between the cylindrical body 13a and the hard disk pack 11, due to slippage at the points of engagement.

Attenuation of unwanted power train energy and motion was generally more effective at the 10% level of elastomeric toroid compression than at the 20% level.

As seen in FIG. 2, the type of disk drive used in the tests had a hard disk pack 11 of two hard disks and a rotary actuator 9 with an armstack of four arms 9a, each arm mounting a transducer 9d4, one transducer for each disk surface. The transducers, or magnetic heads, as well as the hard disks, were numbered 0, 1, 2, 3, from top to bottom in the armstack. Tests were conducted with respect to all of the heads 9d4.

Figure 6:
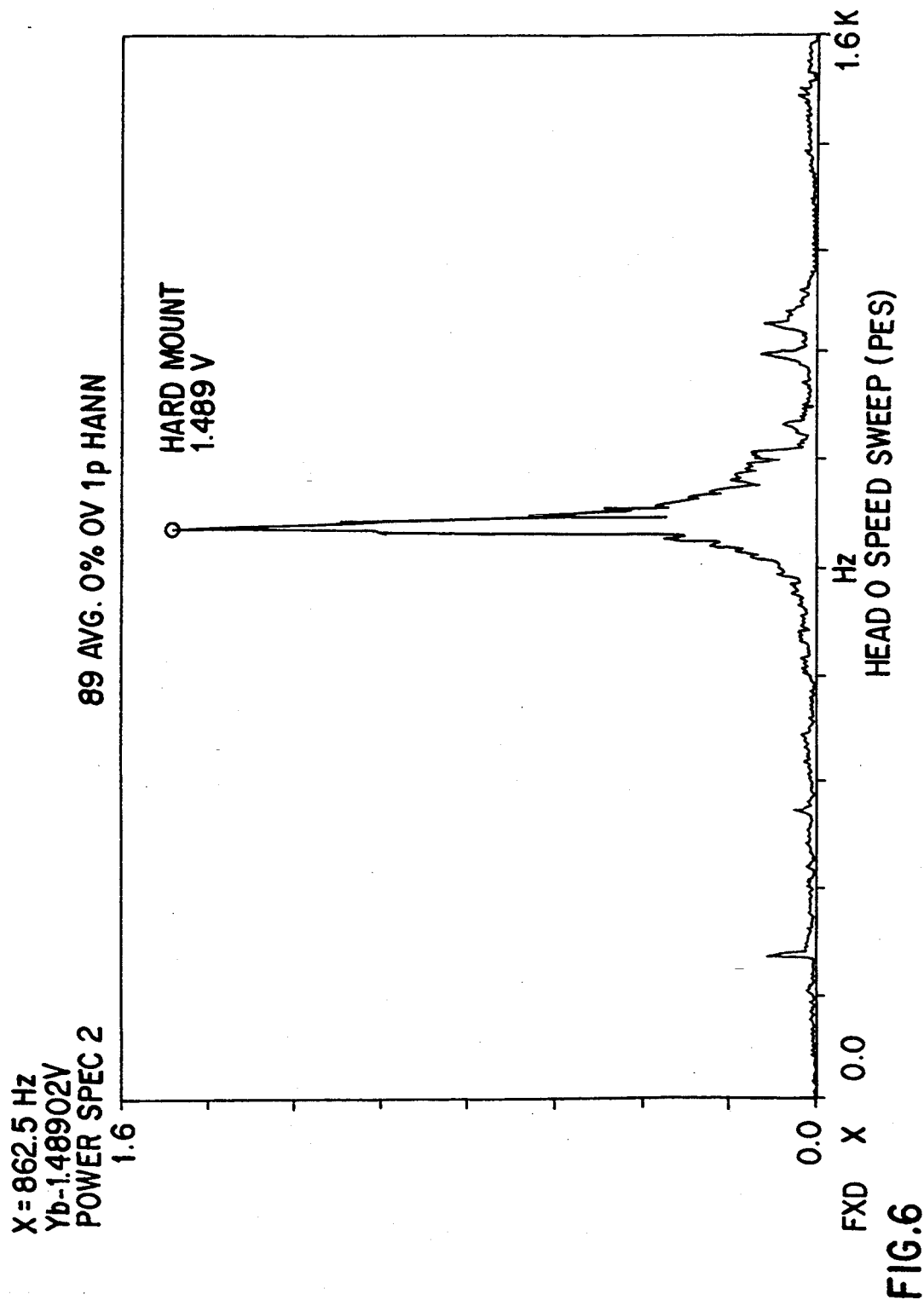
FIG. 6 and 7 illustrate comparative test results of head/disk assembly disturbances for hard and compliant hard disk pack mounts, as seen in FIGS. 1 and 2, respectively, in the same disk drive, using the same magnetic head.
Figure 7:
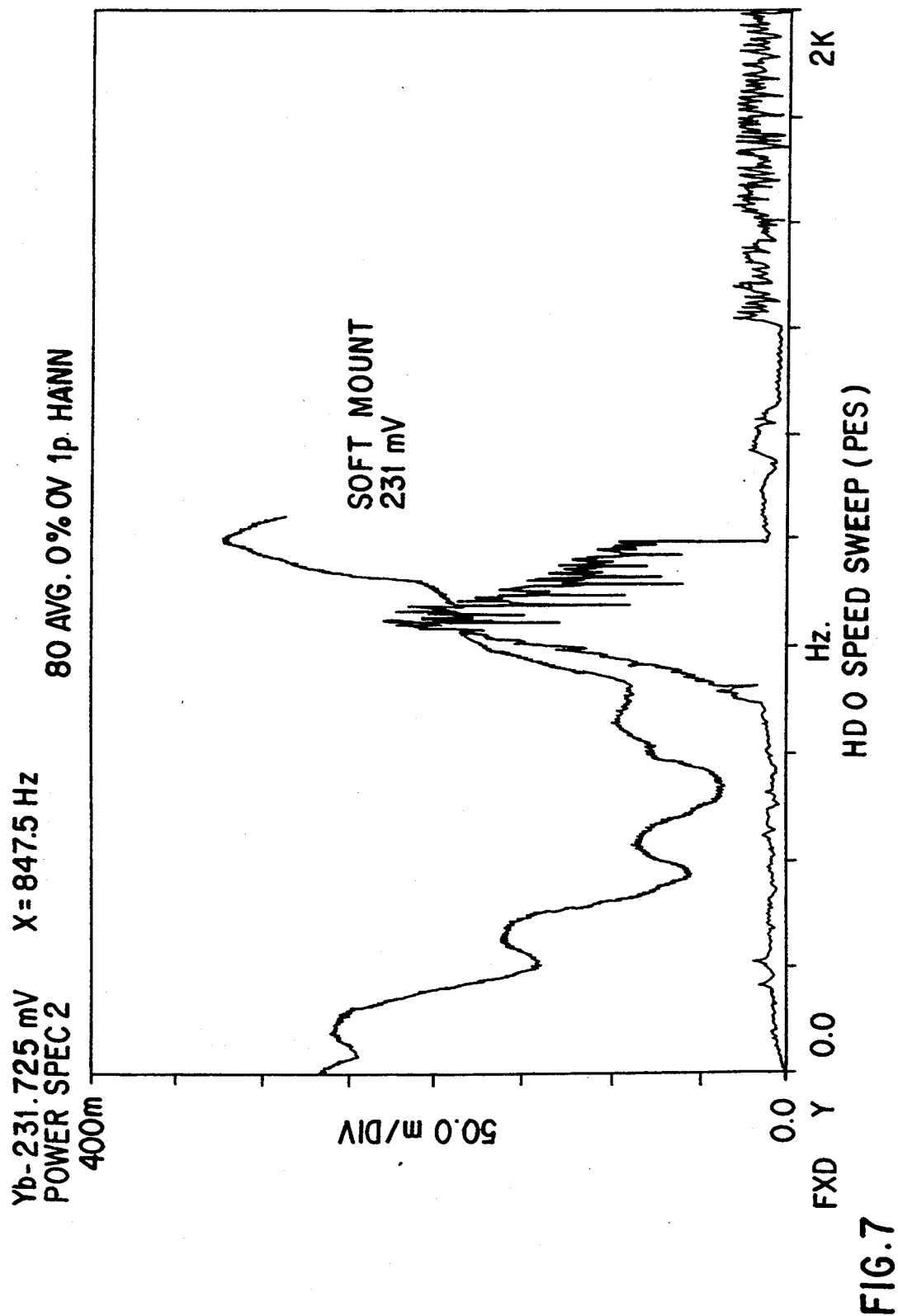

Test results are shown in FIGS. 6 and 7, only for head zero, in a disk drive, number 2890, for the hard mount and the soft mount (10% O-ring compression) of the hard disk pack mount. The speed sweep of the position error signal for head zero is performed with respect to disk track zero in this disk drive. As seen in FIG. 6, the hard mount, the peak is 1.489 V. As seen in FIG. 7, the soft mount (10%), the peak is only 231 mV, a reduction of about 85%.

Briefly, the soft mount test procedure comprised a dynamic signal analyzer, a 5 volt power supply, a signal generator, and a hard disk drive.

Tests of the hard mount and the soft mount were conducted using head zero and track zero on the same disk drive, track zero being the outer track on the upper surface of the upper disk of the hard disk pack, which is the worst case track for unwanted disk motion of the disk assembly in the disk drive tested, head zero being the head for that upper surface.

The signal generator supplied drive motor power from the power supply in the proper waveform at a variable frequency to control the speed of rotation of the disk spindle motor.

The analyzer was connected to head zero to respond to the position error signal of head zero at the various speeds of rotation of the hard disk pack. The analyzer was triggered by the index mark on track zero to associate the track position error signal with the annular position of the disk.

The analyzer was set up for a power spectrum measurement. Continuous peak was chosen for the display. As is known, the power spectrum is based in the frequency domain and shows the relative magnitude of the frequency components in a signal.

In conducting the test for both the hard and soft disk pack mounts, the speed of the motor was increased slowly while data was recorded by the analyzer. Using the continuous peak display option, the maximum value at each frequency observed during this sweep of the spindle speed was retained. By continuing to increase the speed of rotation of the hard disk pack, the speed of rotation approached the resonant frequency of the disk assembly. At resonance, the unwanted spindle motion was at a maximum value.

The results of this testing of pluralities of disk drives of the comparative types of FIGS. 1 and 2, using all heads, 9d4, as typically represented in the test results seen in FIGS. 6 and 7, for one disk drive (head zero, track zero), confirm that the elastomeric toroids, such as O-rings, in the hard disk pack mount, significantly reduce the amount of unwanted motion at the head/media interface.

The speed sweeps of FIGS. 6 and 7, in particular, illustrate this. An examination of the sweeps shows that 85% to 90% of the resonance peak of displacement is eliminated by the soft disk mounts. This is very important, given the tendency of disk drive resonance to drift in the presence of temperature variations.

At high temperature, with the hard mount of FIG. 1, the natural frequency of the drive tends to move. In the worst case, it lines up with one of the spindle driving frequencies. In extreme cases, the result may be high temperature write fault failures.

Damping the motion resulting from the disk drive natural frequency lining up with a spindle driving frequency is a primary benefit of this compliant hard disk pack mount. Since the data shows that between 85% and 90% of the resonance amplitude can be eliminated regardless of the starting characteristics of the drive, it is reasonable to expect lessening of the write fault failures.

Other comparative testing of the hard mounted and soft mounted hard disk packs, indicates improved shock resistance provided by the soft mounted hard disk pack.

Figure 4:
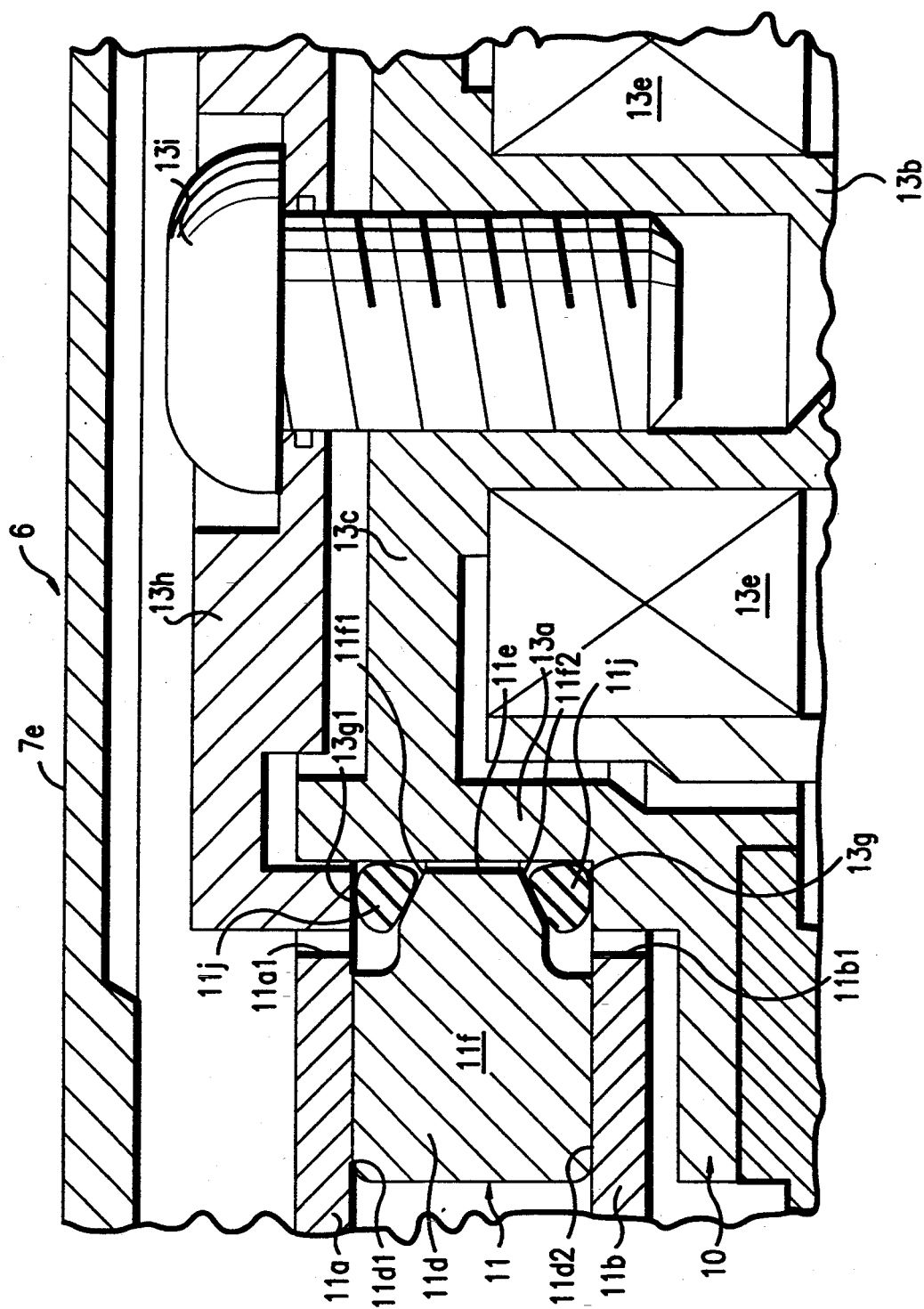
FIG. 4, is an enlarged illustration of the type of FIG. 3, of another embodiment of this invention.

A variation of the invention illustrated and discussed in connection with FIG. 3 is seen in FIG. 4. In FIG. 4, the internal annular flange 11f of the hard disk support ring 11d is chamfered at its inner edge to provide converging surfaces, 11f1, 11f2, which converge in the direction of the cylindrical body 13a. The elastomeric toroids 11j are now compressed between the peripheral rim 13g1 of the clamp 13h and the converging surface 11f1 at the top of the stack, and, the shoulder 13g and the converging surface 11f2 at the bottom of the stack. The advantages of the soft mount are retained insofar as attenuation of unwanted power train motion is concerned, with the added advantage that a radial component of force is introduced which, ideally, is uniform around the hard disk support ring 11d. This tends to center the hard disk pack 11 on the cylindrical body 13a of the motor rotor 13.

Figure 5:
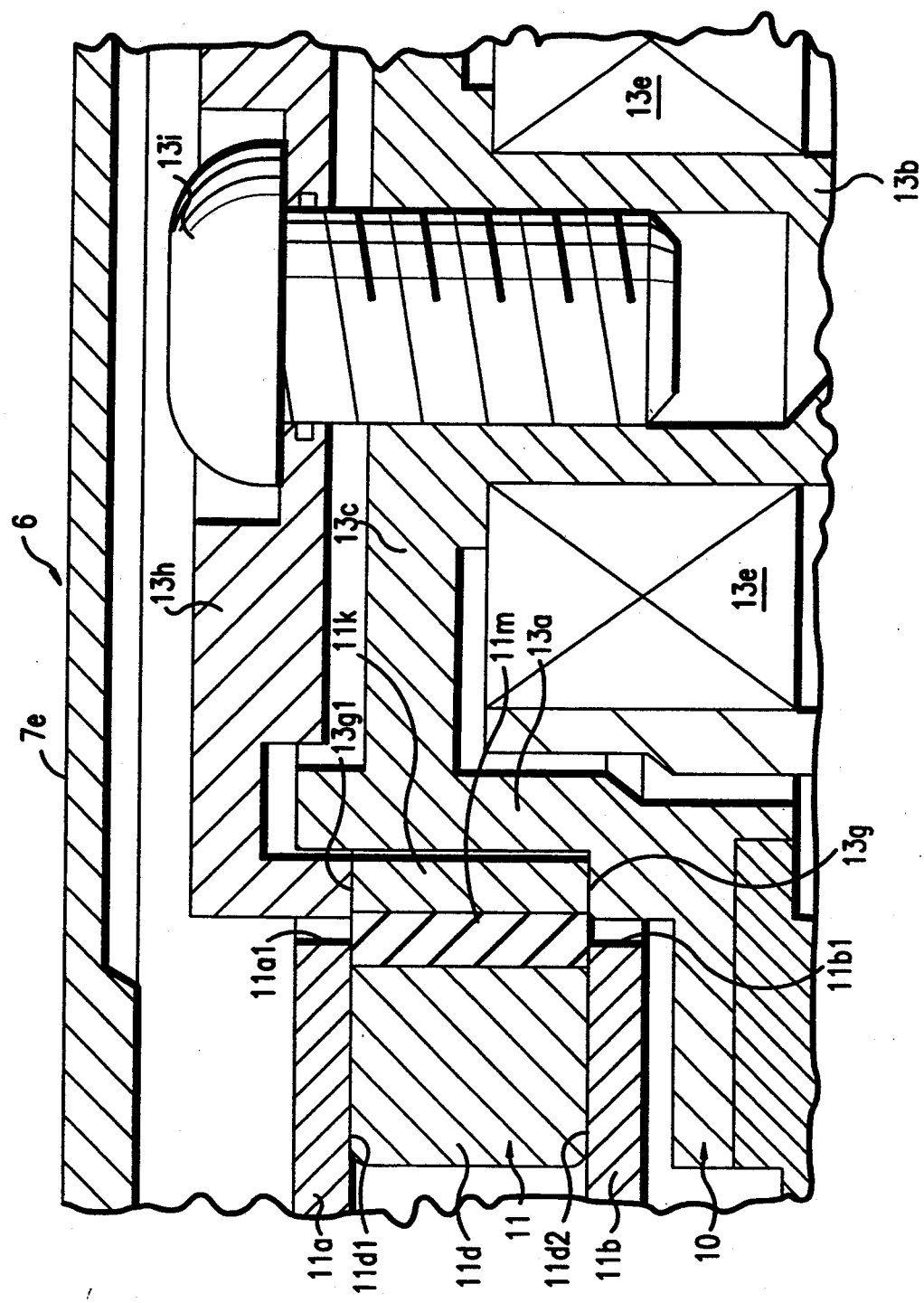
FIG. 5, is an enlarged illustration, of the type of FIG. 2, of a further embodiment of this invention

FIG. 5 illustrates a different approach to the soft or compliant mounting of the disk pack 11. Here, the hard disk support ring 11d and a mounting ring 11k of metal are concentrically positioned and bonded together by an elastomeric ring 11m disposed in a concentric position therebetween. The elastomeric material 11m is selected to have the required compliance and damping for this installation. A suitable material is butyl rubber, fluorocarbon-based compounds, etc. Clamping pressure is now applied by the clamp 13h, the peripheral edge 13g1 of which seats upon the upper edge of the mounting ring 11k, the bottom edge of the mounting ring 11k being seated upon the shoulder 13g on the cylindrical body 13a. Clamping pressure is applied in that degree required to avoid slippage of the mounted ring 11k at the interfaces 13g and 13g1 in the environment of use of the disk drive 6.

Although specific implementations of the compliant mounting of the disk pack 11, according to this invention, have been presented herein, variations of these implementations will be readily apparent to the skilled in the art in practicing the inventive concept of providing a soft, or compliant, mount for an integrated hard disk pack 11 and disk spindle motor 5 in a disk drive 6.

What is claimed is:

1. A disk assembly for minimizing unwanted disk motion in a hard disk pack comprising:
   a. a power train including a rotatable cylindrical body with a cylinder axis about which said cylindrical body rotates;
   b. a hard disk support ring having a hard annular axial face and a central circular opening;
   c. a hard disk having a central circular opening of greater diameter than said central circular opening of said hard disk support ring;
   d. means for concentrically securing said hard disk to said hard annular axial face of said hard disk support ring to form a separate hard disk pack;
   e. said cylindrical body fitting through said central circular opening of said hard disk support ring of said separate hard disk pack, and
   f. means for cylindrical mounting said hard disk support ring of said separate hard disk pack to said cylindrical body independently of engagement with said hard disk, in a position concentric with said cylinder axis.

2. The disk assembly according to claim 1, in which said means for compliantly mounting said hard disk support ring of said separate hard disk pack to said cylindrical body comprises:
   a. elastomeric means disposed between said hard disk support ring and said cylindrical body.

3. The disk assembly according to claim 1, in which said means for compliantly mounting said hard disk support ring of said separate hard disk pack to said cylindrical body comprises:
   a. an internal annular flange defining said central circular opening of said hard disk support ring;
   b. an external annular flange on said cylindrical body;
   c. an axially displacable clamp on said cylindrical body in a position axially displaced from said external annular flange on said cylindrical body;
   d. said hard disk support ring being disposed about said cylindrical body between said clamp and said external flange, and
   e. a first elastic spacer between said internal annular flange on said hard disk support ring and said external annular flange on said cylindrical body and a second elastic spacer between said internal annular flange on said hard disk support ring and said clamp, said clamp applying pressure to said second elastic spacer to thereby secure said internal annular flange of said hard disk support ring to said cylindrical body in compression between said first elastic spacer and said second elastic spacer for resiliently mounting said separate hard disk pack to said cylindrical body.

4. The disk assembly according to claim 3, in which:
   a. said pressure applied by said clamp prevents relative angular and radial displacement between said hard disk pack and said cylindrical body due to slippage between said elastic spacers and said cylindrical body and between said elastic spacers and said internal annular flange.

5. The disk assembly according to claim 3, in which:
   a. said elastic spacers are elastic toroids.

6. The disk assembly according to claim 5, in which:
   a. compression of said elastic toroids in the presence of clamping pressure of said clamp is about 10% to 20%.

7. The disk assembly according to claim 1, in which said means for resiliently mounting said hard disk support ring of said separate hard disk pack to said cylindrical body comprises:
   a. a mounting ring concentrically disposed within said central opening of said hard disk support ring;
   b. an elastomeric spacer disposed between and bonded to said mounting ring and said hard disk support ring, and
   c. means for securing said mounting ring to said cylindrical body in a position about said cylindrical body concentric with said cylinder axis to provide a compliant mount of said separate hard disk pack to said cylindrical body.

8. The disk assembly according to claim 7, in which said means for securing said mounting ring of said separate hard disk pack to said cylindrical body comprises:
   a. an external flange on said cylindrical body;
   b. an axially displacable clamp on said cylindrical body in a position axially displaced from said external annular flange along said cylindrical body;
   c. said mounting ring of said separate hard disk pack being disposed about said cylindrical body in a position between said clamp and said external annular flange, said clamp clamping said mounting ring between said clamp and said external annular flange.

* * * * *